United States Patent [19]
Utsumi et al.

[11] 4,452,623
[45] Jun. 5, 1984

[54] METHOD FOR PRODUCING OPTICAL MULTIPLE FIBER

[75] Inventors: Atsushi Utsumi, Kawanishi; Masaharu Noguchi, Nishinomiya, both of Japan

[73] Assignee: Dainichi-Nippon Cables, Ltd., Amagasaki, Japan

[21] Appl. No.: 375,263

[22] PCT Filed: Aug. 24, 1981

[86] PCT No.: PCT/JP81/00185
§ 371 Date: Apr. 27, 1982
§ 102(e) Date: Apr. 27, 1982

[87] PCT Pub. No.: WO82/00898
PCT Pub. Date: Mar. 18, 1982

[30] Foreign Application Priority Data
Aug. 28, 1980 [JP] Japan .................. 55-119100
Jul. 4, 1981 [JP] Japan .................. 56-104769

[51] Int. Cl.³ ................ C03B 37/00; C03B 37/14
[52] U.S. Cl. .......................... 65/3.12; 65/4.21
[58] Field of Search ............ 65/3.11, 3.12, 3.2, 65/4.2, 4.21; 350/96.34

[56] References Cited
U.S. PATENT DOCUMENTS

| | | | |
|---|---|---|---|
| 3,004,368 | 10/1961 | Hicks, Jr. ................ | 65/4.2 |
| 3,253,896 | 5/1966 | Woodcock et al. ....... | 65/3.11 |
| 3,554,721 | 1/1971 | Gardner .................. | 65/4.2 |
| 3,615,313 | 10/1971 | Phaneuf .................. | 65/4.21 |
| 4,011,007 | 3/1977 | Phaneuf et al. ......... | 65/4.2 X |
| 4,243,398 | 1/1981 | Nomura et al. .......... | 65/4.2 |

FOREIGN PATENT DOCUMENTS

49-29651 3/1974 Japan .
50-44841 4/1975 Japan .

Primary Examiner—Richard V. Fisher
Attorney, Agent, or Firm—Armstrong, Nikaido, Marmelstein & Kubovcik

[57] ABSTRACT

A method for producing an optical multiple fiber, which comprises bundling a multiplicity of silica glass light-conducting elements and drawing the bundle of the light-conducting elements in the state that a liquid intermediary material (comprising at least one member selected from the group consisting of glass forming oxides, glass modifying oxides and intermediate oxides) exists among the elements; thereby providing a multiple fiber excellent in image-transmitting capacity and image-resolving power, by fusing together a multiplicity of silica glass light-conducting elements with each other in drawing to prevent the occurrence of bubbles.

17 Claims, 2 Drawing Figures

METHOD FOR PRODUCING OPTICAL MULTIPLE FIBER

DESCRIPTION

TECHNICAL FIELD

The present invention relates to a novel method for producing an optical multiple fiber (hereinafter referred to as "multiple fiber") formed of a multiplicity of silica glass light-conducting elements which are fused together.

BACKGROUND ART

The use of a multiple fiber as an image-transmitting means in various fields has been entertained. A multiple fiber made of a multicomponent glass has been already put to practical use as an image-transmitting means of an industrial image-scope. However, since the multiple fiber made of a multicomponent glass has a fatal defect in that a long fiber cannot be used due to high light-transmission loss inherent in multicomponent glasses, the industrial image-scopes presently used are limited to those having a short length, in which the length of its image-transmitting means is at most from about 2 to about 5 m. On the other hand, in case of observing the inside of large-sized apparatuses, such as a nuclear reactor, an image-scope having a long image-transmitting means of 10 m. or more in length is necessary. A multiple fiber formed of silica glass optical fibers is suitable for use as such an image-transmitting means because of low light-transmission loss.

However, the multiple fiber of silica glasses is very difficult to produce when compared to the multiple fiber of multicomponent glasses. For this reason, in spite of having the advantage as mentioned above, it is the present situation that a method for the production has never been concretely proposed, to say nothing of putting it into practical use.

A conventional method of producing a multiple fiber and the reason why the production of a silica glass multiple fiber is difficult are explained below.

A multiple fiber is produced by bundling a multiplicity of glass light-conducting elements, heating the bundle to a high temperature and drawing it from its one end, whereby the cross-sectional area of respective elements is reduced and, simultaneously the elements adjacent to each other are fused together.

In general, the multicomponent glass has a low softening point of not more than 1,000° C. and accordingly is easy to process Also, since its melt viscosity is low, the light-conducting elements made thereof, which are molten and drawn in a drawing step, are easily fused together.

In contrast to this, in the case of silica glasses; first, the softening point thereof is high, i.e. a temperature of not less than 1,800° C., which makes a stable operation in the drawing step difficult, wherein it is necessary to heat a multiplicity of light-conducting elements uniformly to a temperature higher than the softening point. Further, the silica glasses are considerably high in melt viscosity, for instance, pure silica glass has a high viscosity on the order of $10^4$ poises even at a high temperature of 2,200° C. at which the vaporization becomes noticeable. For this reason, the light-conducting elements of silica glasses which are drawn in the molten state are far inferior in flowability (deformability), when compared to light-conducting elements of multicomponent glasses in the molten state. Consequently, the elements are not uniformly fused to each other and a large number of bubbles are produced in the multiple fiber obtained by drawing. The bubbles result from expansion of a gas (mainly air), which has been entrapped between the light-conducting elements due to uniform fusing of the light-conducting elements together in the drawing step, at the high temperature upon drawing. Upon the formation of bubbles, the light-conducting elements around the bubbles partially sustain a large deformation, thus resulting in noticeable partial change in fiber diameter and curving. The noticeable partial change in fiber diameter and the local curving increase light scattering loss in the light-conducting element, or in individual optical fibers when the element is composed of a multiplicity of optical fibers as mentioned below. This increase of the scattering loss remarkably decreases the quantity of light that the light-conducting elements or the optical fibers are capable of conducting, consequently resulting in lowering of the image-transmitting capacity. When a multiple fiber including such light-conducting elements or optical fibers is used as an image-transmitting means, dark points are produced in the transmitted image. Thus, the occurrence of a large number of bubbles in the multiple fiber produces, in large numbers, light-conducting elements or optical fibers defective in image-transmitting capacity, consequently lowering the image-transmitting capacity of the multiple fiber itself.

DISCLOSURE OF INVENTION

It is an object of the present invention to provide a novel method for producing a multiple fiber of silica glasses, which can greatly reduce the occurrence of bubbles.

The present invention relates to a method for producing a multiple fiber which comprises bundling a multiplicity of silica glass light-conducting elements and drawing the bundle of the light-conducting elements in the state that a liquid intermediary material exists among the light-conducting elements, said intermediary material comprising at least one member selected from the group consisting of glass forming oxides, glass modifying oxides and intermediate oxides.

BRIEF DESCRIPTION OF DRAWINGS

With reference to FIG. 1, there is explained below the outline of the method of the present invention and a conceivable mechanism for prevention of bubble occurrence among the light-conducting elements. In FIG. 1, a bundle 1 composed of a multiplicity of light-conducting elements 1a is heated uniformly from its periphery to a high temperature above the softening point of a silica glass constituting the elements 1a by a heating means 3, such as an annular electric furnace, and is drawn in the direction of the arrow in the state that a liquid intermediary material 2 exists among the elements 1a. Numeral 2a indicates the intermediary material in the solid state prior to its changing into a liquid by heating to a high temperature. By this drawing procedure, respective elements 1a adjacent to each other are fused together into a unit as a whole, so that a single multiple fiber 4 is produced.

Figure 1:
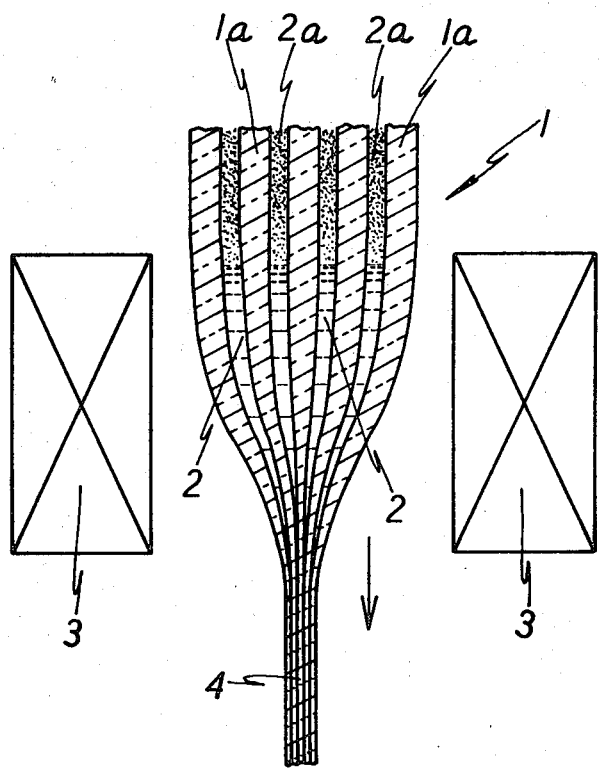
FIG. 1 is a schematic view illustrating the state of bundle of light-conducting elements at the time of drawing in the method of the present invention.

In the present invention, the term "drawing temperature" means a maximum temperature that the light-conducting element bundle 1 reaches in a steady state of the drawing step when heated for drawing, and may be regarded as a temperature approximately the same as the temperature of a heating zone of a heating means, such as, an electric furnace at the time of drawing.

In the method of the present invention, the mechanism of preventing bubbles from occurring may be presumed as follows: A multiplicity of the light-conducting elements are compactly bundled, and the resulting bundle is heated and drawn at one end thereof. Individual light-conducting elements are not always uniform in outer diameter, shape in cross section, straightness, etc., and there are some variations in these factors among the light-conducting elements. Accordingly, in the case where no intermediary material is present in the interstices between the light-conducting elements, there exist (with respect to the relationship between the light-conducting elements adjacent to each other in the state that they are bundled prior to the heat drawing) portions where the surfaces of the adjacent elements come in contact with each other and portions where the surfaces of the adjacent elements do not come in contact with each other. When the light-conducting element bundle is heated and drawn in such a state, the surfaces at the contact portions fuse together in preference to the noncontact portions, so as to leave voids between the light-conducting elements. The voids are expanded at their positions at the high temperature in drawing to form bubbles.

In contrast, when a liquid intermediary material, mentioned below, is present among the light-conducting elements at the time of drawing, the intermediary material prevents to some extent the light-conducting elements from locally fusing together in an early stage. In addition, even if there is an abnormality in parallel arrangement of the light-conducting elements due to local curving, etc. of the elements prior to fusing them together, the intermediary material functions to arrange in parallel the light-conducting elements softened at the time of fusing together, or in the preceding stage, by the attracting action based on the lubricating action and surface tension inherent in liquid, and simultaneously fills the interstices between the light-conducting elements by capillary action based on the surface tension of the liquid intermediary material, so as to effectively prevent the formation of voids. By the above effect, the interstices are not left as voids among the light-conducting elements, and consequently, occurrence of bubbles is prevented.

The light-conducting element which is the subject to be drawn in the present invention may be either a element composed of a single optical fiber or a element composed of a multiplicity of optical fibers fused together with each other, for instance, a multiple fiber produced in accordance with the present invention. As shown in examples described below, it is possible to produce a multiple fiber formed of a greater multiplicity of optical fibers by bundling a multiplicity of multiple fibers produced in accordance with the present invention and applying the present invention to such a bundle. In the present invention, the optical fiber which constitutes a light-conducting element is a silica glass optical fiber consisting of a core and a cladding layer having a lower refractive index than that of the core, and further, if necessary, a support layer. For instance, there are mentioned an optical fiber consisting of a core of pure silica glass and a cladding layer of a silica glass containing a dopant, an optical fiber consisting of a core of a silica glass containing a dopant and a cladding layer of pure silica glass and an optical fiber consisting of a core and a cladding layer, both being made of a silica glass containing a dopant. The core of such an optical fiber may be step-index type or graded-index type in refractive index distribution. When a core is graded-index type, a cladding layer having a lower refractive index than the minimum refractive index of the core may be omitted. The light-conducting element to be drawn may be either in the form of a fiber having an outer diameter of several tens of micrometers or in the form of a rod having an outer diameter of several millimeters.

In the present invention, a bundle of light-conducting elements having an intermediary material between them is first prepared. The number of the light-conducting elements to be bundled varies depending on the outer diameter of the element. For instance, in case of the element having an outer diameter of several tens to several hundreds of micrometers, the number of elements ranging from several thousands to several tens of thousands is adequate, and in case of the element having an outer diameter of 1 to 5 mm., the number of elements ranging from about 7 to about 200 is adequate.

There is a case in which a high melting-point impurity unusable as an intermediary material in the present invention sticks onto the surfaces of the light-conducting elements in the stage prior to interposing the intermediary material between the light-conducting elements; which hinders from sufficiently attaining the object of the present invention, if the intermediary material is applied to the surfaces of the elements without removing such an impurity. Therefore, in the present invention, it is desirable to wash the surfaces of the respective light-conducting elements prior to interposing the intermediary material between the light-conducting elements, in a washing manner conventionally used in the manufacturing of optical fibers, e.g. in a manner of washing with an aqueous solution of hydrofluoric acid and distilled water while applying ultrasonic waves.

Next, the particular intermediary material mentioned after is interposed between the respective light-conducting elements bundled.

The intermediary material used in the present invention is a glass forming oxide, a glass modifying oxide or an intermediate oxide, and moreover those which can exist in the form of liquid in the interstices between the light-conducting elements at the time of drawing.

In the foregoing, the glass forming oxide is one which can singly form a stable glass network and satisfy the well-known glass forming criteria of Zachariasen (e.g. see Taro Moritani et al, "Glass Technology Hand-Book", 10th edition, Asakura-Shoten, Tokyo, 1973, page 5). In general, the single bonding strength (value of dissociation energy of oxide divided by the coordination number thereof) in the glass forming oxide is not less than about 80 kcal. The glass modifying oxide is a substance which has no glass forming ability in itself, but can be present stably as incorporated in a glass network to modify the characteristics of the glass (see the above literature, pages 5 and 6). In general, the single bonding strength in the glass modifying oxide is from about 10 to about 60 kcal. The intermediate oxide is one which has intermediate characteristics between the above-mentioned glass forming oxide and glass modifying oxide, and the single bonding strength thereof is in general from about 60 to about 80 kcal. (see the above literature, page 6).

The reason why the glass forming oxide, glass modifying oxide or intermediate oxide is employed as an intermediary material in the present invention is that they have a lower melt viscosity at a drawing temperature than the silica glasses constituting the optical fiber of the light-conducting element and moreover have a good wettability to silica glasses, and accordingly they have an action of causing the light-conducting elements to favorably fuse together. From this point of view, oxides of elements of Groups II, III, IV and V of the Periodic Table are preferred as intermediary materials among the above-mentioned oxides.

The melt viscosities of silica glasses, i.e. pure silica glass and a silica glass containing $SiO_2$ as a main component, which constitute the optical fiber are far higher than the melt viscosities of oxides of other elements. In other words, at the drawing temperature, the melt viscosity of the intermediary material in the present invention selected from the oxides as mentioned above is very low, when compared with the viscosity of the light-conducting element which is in a stage of softening and deforming at the drawing. Based on this large difference in viscosity, the intermediary material in the present invention exerts the before-mentioned arrangement effect in liquid state. Preferable intermediary materials used in the present invention are those having a viscosity of $10^{-2}$ to $10^3$ poises, especially 1 to $10^2$ poises, at the drawing temperature. If the viscosity of the intermediary material at the drawing temperature is too large, the above-mentioned lubricating effect, attracting effect due to surface tension, void-filling effect, etc. become, in general poor; and consequently, the function of preventing the occurrence of bubbles between the light-conducting elements becomes poor. Although too low of a viscosity for the intermediary material does not cause a serious problem, it tends to lower the function of preventing the bubble occurrence. By the way, $SiO_2$ is known to be a glass forming oxide, but $SiO_2$ cannot be employed alone as an intermediary material in the present invention, since $SiO_2$ used alone shows a high melt viscosity of the same degree as the constituent material of the light-conducting element. As mentioned below, however, $SiO_2$ can be used in combination with other inorganic compounds, thereby lowering the melt viscosity.

Since the interstices between the light-conducting elements which are being drawn are very narrow and the area that the intermediary material vaporizes is small, even a relatively low boiling or volatile material can exist in a liquid state during drawing. However, when an excessively low boiling or excessively high volatile material is used, it vaporizes during drawing and consequently, the object of the present invention cannot be attained. Therefore, materials having a boiling point of not less than 1,200° C. or those having a low volatility, when compared to the volatility of the preceding materials, are preferably used as an intermediary material in the present invention.

As preferable examples of the intermediary material used in the present invention, there are mentioned oxides of elements such as B, P, Ge and Sb which belong to the glass forming oxide, oxides of elements such as Bi, Sn and Tl which belong to the glass modifying oxide, and oxides of elements such as Ti, Cd and Pb which belong to the intermediate oxide. To be concrete, there are mentioned $B_2O_3$, $P_2O_5$, $GeO_2$, $Sb_2O_3$, $Bi_2O_3$, $SnO_2$, $Tl_2O_3$, $TiO_2$, $CdO$, $PbO$, and the like. These oxides may be used alone or as admixtures of two or more kinds thereof. Particularly preferable intermediary materials are $B_2O_3$, $PbO$, $Bi_2O_3$, $Sb_2O_3$, $TiO_2$ and $GeO_2$.

Many inorganic substances have an action of lowering the melt viscosity of $SiO_2$. Therefore, although $SiO_2$ cannot be used alone as an intermediary material as mentioned before, a mixture of $SiO_2$ with one or more kinds of other inorganic substances than $SiO_2$ (hereinafter referred to as "mixed intermediary material") can exist as a liquid having a melt viscosity of not more than $10^3$ poises at a drawing temperature, and such a mixture is also a preferable intermediary material in the present invention. As the inorganic substances used in admixture with $SiO_2$, for instance, there are mentioned oxides which belong to the glass forming oxide, glass modifying oxide or intermediate oxide as defined in the before-mentioned literature, and, to be concrete, there are exemplified oxides of elements such as B, P, Ge, Sb, Bi, Sn, Tl, Ti, Cd, Pb, Al and Ba, e.g. $B_2O_3$, $P_2O_5$, $GeO_2$, $Sb_2O_3$, $Bi_2O_3$, $SnO_2$, $Tl_2O_3$, $TiO_2$, $CdO$, $PbO$, $Al_2O_3$, $BaO$, and the like. As a preferable material of other inorganic substances, there is mentioned fluorine. Although the amount of the above-mentioned inorganic substances admixed with $SiO_2$ varies depending on the kind of the inorganic substance used, the amount is, for instance, from 3 to 1,000 parts by weight, preferably from 10 to 500 parts by weight, per 100 parts by weight of $SiO_2$.

The mixed intermediary material used preferably in the present invention is a mixture of $SiO_2$ with at least one member selected from the group consisting of $B_2O_3$, $TiO_2$, $P_2O_5$, $GeO_2$, $Bi_2O_3$, $Al_2O_3$ and $PbO$, more preferably, a mixture of $SiO_2$ with at least one member selected from the group consisting of $B_2O_3$, $TiO_2$, $Bi_2O_3$ and $PbO$, especially a mixture of $SiO_2$ with, per 100 parts by weight of $SiO_2$, 5 to 500 parts by weight of $B_2O_3$ and 2 to 100 parts by weight of $TiO_2$. These mixed intermediary materials are excellent in wettability, compatibility, etc. with the light-conducting element at a drawing temperature. Therefore, they cause the light-conducting elements to fuse together more uniformly, thus yielding a multiple fiber having more excellent image-resolving power and image-transmitting capacity.

In the present invention, the intermediary material in a stage prior to drawing may be in a solid state, e.g. powder. In case of using an intermediary material in the form of powder, it may be interposed between the light-conducting elements in such a manner as submerging a prescribed number of the light-conducting elements into a bulk of the powder and bundling them therein, or in such a manner as compulsorily running the powder into the interstices between the previously bundled light-conducting elements from one end of the bundle with an adequate carrier gas such as $N_2$, $O_2$ or air.

The intermediary material in a stage prior to drawing may be in the form of a solid filament. In that case, filaments are, for example, inserted into the interstices between the bundled light-conducting elements.

Also, the solid intermediary material may be employed in the form of a solution or a dispersion in a suitable solvent or a dispersant, or may be employed in a molten state. In that case, the intermediary material is interposed between the light-conducting elements in such a manner as immersing a bundle of the elements into a solution, a dispersion or a molten mass, or in such a manner as pouring a solution, a dispersion or a molten mass into the bundle from its one end.

In the present invention, it is sufficient that the amount of the intermediary material which is interposed between the light-conducting elements is small. Expressing the amount of the intermediary material to be applied onto the surface of the element in terms of the ratio of a cross-sectional area of the intermediary material to a cross-sectional area of the element, the amount is, for instance, about 0.1 to about 1%. In case that the intermediary material is used in the form of solution or dispersion, the solvent or the dispersant is removed, for instance, by subjecting the element bundle to heat treatment prior to entering the drawing step.

In a preferable manner of interposing the intermediary material between the light-conducting elements, a precursor of the intermediary material is used. The term "precursor" as used herein means a material capable of forming the intermediary material as mentioned before by decomposition, oxidation or other chemical reactions, caused by heating at the time of drawing or in a stage prior to the drawing. For instance, various substances can be employed as a precursor, e.g. an acid of an element constituting the intermediary material, a salt of said acid, and a carbonate, nitrate, sulfate, halide, hydroxide, organic acid salt, chelate compound or the like of an element constituting the intermediary material. For instance, in case that the intermediary material is $B_2O_3$, acids of boron such as $H_3BO_3$, or halides of boron such as $BCl_3$ can be employed as a precursor. $H_3BO_3$ is decomposed to produce $B_2O_3$ when heated at about 190° C., and $BCl_3$ reacts with $O_2$ to produce $B_2O_3$ when heated at about 700° C. in the presence of oxygen gas. Referring to another instance in which the intermediary material is a mixed intermediary material of $SiO_2$ and $B_2O_3$, a mixture of $SiCl_4$ and $BCl_3$ is employed as a precursor. Those precursors produce a mixture of $SiO_2$ and $B_2O_3$ when heated at about 800° C. in the presence of oxygen gas.

As concrete examples of the precursor other than the above-mentioned, there are preferably employed boranes such as $BH_3$, halogenated borones such as $BH_2F$, $BHF_2$, $BF_3$, $BH_2Cl$, $BHCl_2$ and $BH_2I$, diboranes such as $B_2H_6$, alkoxylated borons such as $B(OCH_3)_3$, halogenated titaniums such as $TiF_4$, $TiCl_4$ and $TiBr_4$, phosphines such as $PH_3$, halogenated phosphines such as $PH_2F$, $PHF_2$, $PF_3$, $PH_2Cl$, $PHCl_2$, $PCl_3$, $PH_2Br$ and $PHBr_2$, phosphorus oxyhalides such as $POCl_3$ and $POBr_3$, phosphonitrile chlorides such as $(PNCl_2)_3$, $(PNCl_2)_4$, $(PNCl_2)_5$, $(PNCl_2)_6$ and $(PNCl_2)_7$, germanes such as $GeH_4$, halogenated germanes such as $GeH_3F$, $GeH_2F_2$, $GeHF_3$, $GeF_4$, $GeH_3Cl$, $GeH_2Cl_2$, $GeHCl_3$, $GeCl_4$, $GeH_3Br$, $GeH_2Br_2$, $GeHBr_3$ and $GeBr_4$, halides such as $AlCl_3$, $SbCl_3$, $SbCl_5$, $CdCl_2$, $TlCl$, $BiCl_2$, $BiCl_3$, $SnCl_2$, $SnCl_4$ and $PbCl_2$.

Precursors of $SiO_2$ other than the above-mentioned include silanes such as $SiH_4$, halogenated silanes such as $SiH_3F$, $SiH_2F_2$, $SiHF_3$, $SiF_4$, $SiH_3Cl$, $SiH_2Cl_2$, $SiHCl_3$, $SiH_3Br$, $SiH_2Br_2$, $SiHBr_3$, $SiBr_4$, $SiH_3I$ and $SiH_2I_2$, and the like. Among them, perhalides, especially $SiCl_4$, are preferable.

The above-mentioned precursors produce oxides as the intermediary materials, when heated to a high temperature, e.g. a temperature of not less than 500° C., especially not less than 800° C., in the presence of oxygen element, e.g. oxygen gas.

In general, most of the precursors are in the state of liquid or gas at a lower temperature or are ready to provide a solution in water or other solvents, as compared with the intermediary materials themselves. When the intermediary material is interposed between the light-conducting elements in the form of a fluid such as gas, liquid or solution, it can be more uniformly applied to the surfaces of respective light-conducting elements as compared with the case using a powder. Since the uniform application of the intermediary material to the surfaces of the respective light-conducting elements has an effect on attaining the object of the invention, a manner using the precursor capable of readily changing into a fluid is very preferable as a manner of interposing the intermediary material in the present invention.

In case of using a gaseous precursor, it may be applied onto the surfaces of the light-conducting elements in manners, such as wherein while maintaining a bundle of the elements at a temperature lower than the boiling point of the precursor, the precursor gas is continuously passed alone or together with a carrier gas such as nitrogen, oxygen or air through the interstices between the elements from one end of the bundle, so as to condense the precursor gas on the element surfaces. Also, while maintaining the light-conducting element bundle at a temperature that a precursor gas is capable of reacting to form an intermediary material, the precursor gas may be passed through the interstices between the elements, if desired, together with a gas for permitting a reaction necessary for production of the intermediary material to take place, whereby the intermediary material is produced by the reaction and simultaneously is deposited on the element surfaces.

As a precursor, the preferred is those capable of passing with a carrier gas, particularly with oxygen gas, in a gaseous state, in other words, those capable of mixing with a carrier gas in a proportion of about 0.1 to about 200 parts by volume, preferably about 0.5 to about 100 parts of volume, more preferably about 1 to about 50 parts by volume, to 100 parts by volume of the carrier gas at a temperature that the precursor is capable of reacting to form an oxide, e.g. 800° to 1,500° C. Also, if a mixed gas of a precursor and a carrier gas can be transferred at a low temperature, heat insulation of a transfer pipe for the mixed gas becomes easy. From this point of view, substances having a sufficient vapor pressure at a low temperature, concretely those having a vapor pressure of at least 10 mmHg at 300° C. are preferred as a precursor.

Figure 2:
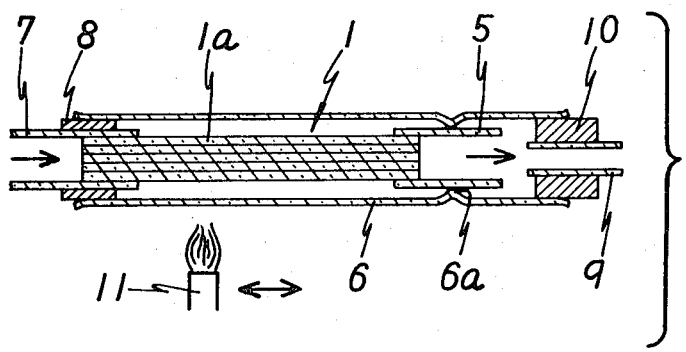
FIG. 2 is a schematic view illustrating a manner of forming a layer of an intermediary material on the surface of respective light-conducting elements of a light-conducting element bundle in the method of the present invention.

FIG. 2 is a view explaining in detail a method in which the above-mentioned precursor gas is employed and an intermediary material produced by the reaction of the precursor is deposited on the surfaces of light-conducting elements. In FIG. 2, a bundle 1 composed of a multiplicity of light-conducting elements 1a is inserted with its one end into a dummy glass tube 5 which is connected by fusion with the light-conducting elements located at the periphery of the bundle 1, and is placed in a reactor tube 6, e.g. a silica glass tube which is circular in cross section. Numeral 6a is a projection provided on the inner wall of the reactor tube 6, and the light-conducting element bundle 1 is supported by the projection 6a approximately in the center of the reactor tube 6. A gas feed tube 7 is fixed to the end of the bundle 1 opposite to the end connected to the dummy glass tube 5, such that the bundle 1 is tightly inserted into the feed tube 7. The end portion of the feed tube 7 into which the bundle 1 is inserted is hermetically fixed to the reactor tube 6 through a heat resisting sealing material 8 such as a fluororesin sealing material. An exhaust tube 9 is hermetically fixed through a heat resisting stopper 10, such as a fluororesin stopper, to the end of the reactor tube 6 opposite to the end to which the gas feed tube 7 is fixed. While rotating the reactor tube 6 and the bundle 1 located inside it on an axis of the feed tube 7 and the exhaust tube 9 at a rate of several to several tens of rotations per minute (or without the rotation), the bundle 1 is heated from the outside of the reactor tube 6 to a temperature necessary to cause the reaction for producing the intermediary material by means of a burner 11 which reciprocates in parallel with the reactor tube 6. Other heating means such as a fixed type electric furnace may, of course, be employed in place of the burner 11. Although the above heating temperature varies depending on the reaction temperature of the precursor gas used, it is preferable that the bundle 1 is heated to at least about 500° C., especially at least about 800° C., in order to sufficiently produce an oxide. If the heating temperature is too high, vaporization of the produced oxide and deformation of the light-conducting elements take place. Therefore, it is preferable that the bundle 1 is heated to a temperature of not more than 1,700° C., especially not more than 1,500° C. In general, the most preferable heating temperature is from 900° to 1,200° C.

When a mixed gas of the before-mentioned precursor and a carrier gas is fed to the reactor tube 6 through the feed tube 7, most of the mixed gas passes through the interstices between the individual light-conducting elements which constitute the bundle 1, and during this time, the gas reacts to produce an intermediary material at the portion maintained at a high temperature by the moving burner 11. Unreacted gas, gaseous products formed by the reaction, and the like are exhausted from the exhaust tube 9 through the dummy glass tube 5 to the outside.

In case of using the precursor, a sufficient amount of an intermediary material can be deposited on the surfaces of the light-conducting elements, when a mixed gas of a precursor gas and a carrier gas is fed for about 10 minutes to about 10 hours at a flow rate of about 50 to about 2,000 ml./minute. In general, the thickness of the deposition layer is made uniform by gradually depositing the intermediary material, rather quickly depositing; therefore, it is desirable that the mixed gas is fed for about 30 minutes to about 5 hours at a low flow rate of less than 1,000 ml./minute.

From the viewpoint of more stable production of a high-efficient multiple fiber free from bubbles, a two stage treatment is preferred, wherein an intermediary material having a low melt viscosity is first deposited on the surfaces of light-conducting elements, and then, there is deposited thereon a layer of the above-mentioned $SiO_2$-containing mixed intermediary material which has an excellent compatibility with the material of the light-conducting element. Preferable intermediary materials to be applied at the above first stage are those having a viscosity of hot more than $10^2$ poises at a drawing temperature, e.g. $B_2O_3$, $Sb_2O_3$, $Tl_2O_3$ and $Bi_2O_3$. It is also possible to conduct a three stage treatment in which a layer of an intermediary material having a low melt viscosity as used in the first stage is further deposited on the layer of the mixed intermediary material.

The amount of the intermediary material to be applied in each of the first stage and the third stage, in terms of the ratio of the cross-sectional area of the intermediary material layer to the cross-sectional area of the light-conducting element, is from about 0.01 to about 0.1%. Also, the amount of the mixed intermediary material to be applied in the second stage is from about 0.1 to about 1% in terms of the same area ratio as mentioned above.

In the present invention, the above-mentioned plural manners for interposing the intermediary materials may be combined. One of the preferable combinations is a combination of a manner using an aqueous solution of a precursor and a manner using a mixed gas of a precursor gas and a carrier gas. Another preferable combination is a combination of a manner of inserting the beforementioned solid filaments as an intermediary material and a manner using a mixed gas of a precursor gas and a carrier gas. In such a combined use of different interposing manners and in case that the precursor is a fluid, the interposing manners for respective intermediary materials may be applied in arbitrary order, and also may be applied alternatively again and again.

Since the aount of the intermediary material used in the present invention is small, in practice, the intermediary material does not exert a bad influence on the image-transmitting characteristics of the multiple fiber, even if it remains between the light-conducting elements fused together after drawing.

The intermediary materials used in the present invention have, in general, a different refractive index from a glass material constituting the optical fiber core in the light-conducting element, and except the intermediary materials containing B or F, have a larger refractive index than that of $SiO_2$. When the intermediary material having a higher refractive index than that of $SiO_2$ remains in the interfaces between the light-conducting elements with a certain degree of thickness even after drawing, the intermediary material layer produces an optically favorable effect and serves as a shielding layer.

In the present invention, it is desirable to include a light-absorbing material in the intermediary material, whereby even if a light signal leaks out from individual optical fibers in the multiple fiber, it is absorbed by the light-absorbing material remaining in the interfaces between the light-conducting elements after drawing, and therefore, can be prevented from entering into the adjacent optical fibers. As such light-absorbing materials, there are mentioned substances having a characteristic absorption in the visible rays region of 0.4 $\mu$m. to 0.7 $\mu$m. in wavelength ($\lambda$), e.g. substances containing elements such as Fe, Ni, Co, Mn, Cr and Cu, e.g. oxides of these elements. the light-absorbing material exerts a satisfactory light-absorbing effect, even if it exists in an amount of about 0.001% by weight in the intermediary material.

The light-conducting element bundle 1, treated in various kinds of manners as mentioned above so that the intermediary material is interposed between the light-conducting elements 1a, is then subjected to the drawing procedure after being taken out of the reactor tube 6 or together with the reactor tube 6. This drawing procedure can be conducted in the same manner and under the same temperature condition as in the drawing of a preform in the production of silica glass optical fibers. That is to say, it is satisfactory to heat one end of the above-mentioned element bundle or reactor tube admitted with the bundle at a temperature of about 1,900° to about 2,200° C. and then draw it. In the case of drawing together with the reactor tube, there is obtained a multiple fiber having a skin layer of silica glass on the periphery of the bundle to a multiplicity of the light-conducting elements fused together. If the drawing temperature is low, the viscosity of the molten silica glass is high and the light-conducting elements are hindered from fusing together firmly. On the other hand, if the drawing temperature is too high, the silica will vaporize and sublimate noticeably. Accordingly, the drawing is carried out preferably at a temperature of about 1,950° to about 2,100° C.

Even if the intermediary material which is adhered in a liquid state to the surfaces of the light-conducting elements, is solidified during transferring from the step of interposing the intermediary material to the drawing step; this causes particularly no inconvenience.

In cases where a precursor in the form of a solution or in a molten state, or in a gaseous state is employed, and when the intermediary material is present on the surfaces of the light-conducting elements still in the form of the precursor before conducting the drawing; it is preferable that the intermediary material is produced prior to the drawing, in such a manner as heating previously the bundle to a high temperature so as to make the precursor cause a necessary reaction.

When the number of the optical fibers included in the light-conducting element bundle to be drawn is a prescribed number, e.g. 100 to 100,000, the bundle is drawn to the desired outer diameter, e.g. 0.4 to 2.0 mm., to give a multiple fiber as a final product.

In the present invention, when the number of the optical fibers included in the multiple fiber produced by the method mentioned above is smaller than the desired number, it is also possible to employ such a multiple fiber itself as a light-conducting element and apply thereto the method explained hereinbefore. That is, it is possible to prepare a bundle of multiple fibers, in the interstices between which the intermediary material is interposed, and then to draw the bundle to fuse the multiple fibers together with each other. Thus, a multiple fiber having a larger number of the optical fibers can be produced.

It is suitable that the diameter of each optical fiber in the multiple fiber as a final product is usually from about 10 to about 50 $\mu$m.

DESCRIPTION OF THE PREFERRED EMBODIMENTS

The method of the present invention is explained below in more detail with reference to Examples and Comparative Example.

EXAMPLE 1

There were bundled 91 light-conducting elements (each element consisting of single optical fiber consisting of a pure silica glass core of 1.1 mm. in outer diameter, a cladding layer formed on the core, of 0.2 mm. in thickness and made of silica glass doped with $B_2O_3$, and a silica glass support layer of 0.05 mm. in thickness formed on the cladding layer, and having an outer diameter of 1.6 mm. and a length of 50 cm.), so that the interstices between the elements were minimized and the bundle took the shape of a hexagon in cross section. One end of the bundle was then inserted into a silica glass tube of 18 mm. in inner diameter and joined therewith by fusion, and after fitting a gas feed tube to the opposite end, the whole was washed in a 20% by volume aqueous solution of hydrofluoric acid and then in distilled water, while applying ultrasonic waves, and the whole was dried. The bundle of the light-conducting elements was inserted into a silica glass reactor tube of 30 mm. in inner diameter, so as to locate at the center of the reactor tube. $BCl_3$ gas and $O_2$ gas were continuously fed through the gas feed tube to the interstices between the light-conducting elements for about 15 minutes at flow rates of 20 ml./minute and 200 ml./minute, respectively, while rotating the whole of the reactor tube at a revolution rate of 10 r.p.m. and simultaneously moving an oxyhydrogen flame burner back and forth in parallel with the reactor tube at a velocity of 10 cm./minute. The temperature of the light-conducting elements at the portion heated by the oxyhydrogen flame burner was about 600° to about 1,000° C. which was measured by an infrared thermometer. Thus, a layer of $B_2O_3$ having a thickness of about 5 $\mu$m. was formed and adhered onto the surfaces of the light-conducting elements.

The thus treated element bundle was taken out from the reactor tube, and the end of the bundle to which the silica glass tube had been joined was heated and drawn at 1,900° C. to produce a multiple fiber including 91 optical fibers and having an outer diameter of 1.6 mm.

By employing 91 multiple fibers so obtained, the same procedure as above was repeated to produce a multiple fiber including 8,281 optical fibers and having an outer diameter of 1.4 mm.

COMPARATIVE EXAMPLE 1

A multiple fiber including 8,281 optical fibers and having an outer diameter of 1.4 mm. was produced in the same manner as in Example 1, except that the treatment for adhering the $B_2O_3$ layer was not carried out.

EXAMPLE 2

A multiple fiber including 8,281 optical fibers and having an outer diameter of 1.4 mm. was produced in the same manner and under the same condition as in Example 1, except that $BCl_3$ gas, $SiCl_4$ gas and $O_2$ gas were fed at flow rates of 20 ml./minute, 20 ml./minute and 200 ml./minute, respectively.

In examination of the sections of the respective multiple fibers produced in Examples 1 and 2 and Comparative Example 1 with an optical microscope of 50 magnifications, there occurred about 10 bubbles on the average each having a diameter of about 10 to about 100 $\mu$m. within the visual field of the microscope in the multiple fiber produced in Comparative Example 1, but no occurrence of bubbles was observed in the multiple fibers produced in Examples 1 and 2.

EXAMPLE 3

There were bundled with the closest packing 91 light-conducting elements (each element consisting of single optical fiber consisting of a core of pure silica glass doped with $GeO_2$ and a pure silica cladding layer formed on the core, and having an outer diameter of 1.6 mm. and a length of 50 cm.), so that the bundle took the shape of a hexagon in cross section. After providing both ends of the bundle with a silica glass tube and a gas feed tube in the same manner as in Example 1, the surfaces of the respective light-conducting elements were washed and dried in the same manner as in Example 1. The bundle was then immersed in a 20% by weight aqueous solution of boric acid ($H_3BO_3$) maintained at 90° C.; and after lifting up perpendicularly and drying in the atmosphere, the bundle at large was placed in an electric furnace. The bundle was heated first at 300° C. for 5 minutes and then at 1,000° C. for 10 minutes, so as to thermally decompose $H_3BO_3$ which was adhered to the light-conducting element surfaces and to form a $B_2O_3$ layer having a thickness of about 7 μm. The element bundle was taken out from the electric furnace and drawn at 2,000° C. to produce a multiple fiber in which the number of the optical fibers was 91 and of which the outer diameter was 1.6 mm.

EXAMPLE 4

The same procedure as in Example 3 was repeated, except that a 20% by weight aqueous solution of thallium nitrate ($TlNO_3$) maintained at 90° C. was employed instead of the aqueous solution of boric acid to form $Tl_2O_3$ on the surfaces of the light-conducting elements by adhering thallium nitrate onto the element surfaces and thermally decomposing it, and the drawing was carried out at 2,040° C., to produce a multiple fiber in which the number of the optical fibers was 91 and of which the outer diameter was 1.6 mm.

EXAMPLE 5

A multiple fiber including 91 optical fibers and having an outer diameter of 1.6 mm. was produced in the same manner as in Example 3, except that a 40% by weight aqueous solution of lead nitrate maintained at 60° C. was employed instead of the aqueous solution of boric acid.

EXAMPLE 6

A multiple fiber including 91 optical fibers and having an outer diameter of 1.6 mm. was produced in the same manner as in Example 3, except that an aqueous solution prepared by dissolving 200 p.p.m. of $Co(NO_3)_2$ in a 20% by weight aqueous solution of boric acid, which was maintained at 90° C. and which was employed to form a mixture of $B_2O_3$ and $CoO$ on the surfaces of the light-conducting elements.

EXAMPLE 7

A multiple fiber including 8,281 optical fibers and having an outer diameter of 1.4 mm. was produced in the same manner as in Example 2, except that prior to the treatment using $BCl_3$ gas, $SiCl_4$ gas and $O_2$ gas, the bundle of the light-conducting elements was immersed in a 20% by weight aqueous solution of boric acid maintained at 90° C.; and after lifting up perpendicularly and drying in the atmosphere, the bundle at large was placed in an electric furnace and heated at 500° C. for 10 minutes to stick $B_2O_3$ onto the surfaces of the elements.

EXAMPLE 8

A multiple fiber including 8,281 optical fibers and having an outer diameter of 1.4 mm. was produced in the same manner as in Example 1, except that for the bundle of the light-conducting elements to be subjected to the treatment with $BCl_3$ gas and $O_2$ gas, there was employed a bundle, into the all interstices between the elements of which glass filaments consisting of 5% by weight of $B_2O_3$, 0.7% by weight of F and 94.3% by weight of $SiO_2$ and having an outer diameter of 0.22 mm. were previously inserted.

In examination of the sections of the respective multiple fibers produced in Examples 3 to 8 with an optical microscope of 50 magnifications, no occurrence of bubbles was observed in the interfaces between the light-conducting elements fused together with each other in any multiple fibers.

EXAMPLES 9 TO 20

There were bundled 169 light-conducting elements (each element consisting of single optical fiber consisting of a pure silica glass core of 1.1 mm. in outer diameter, a cladding layer formed on the core, of 0.2 mm. in thickness and made of a silica glass doped with $B_2O_3$, and a silica glass support layer of 0.05 mm. in thickness formed on the cladding layer, and having an outer diameter of 1.6 mm. and a length of 50 cm.), so that the interstices between the elements were minimized and the bundle took the shape of hexagon in cross section. One end of the bundle was then inserted into a silica glass tube having an inner diameter of 25 mm. and fused together therewith, and the opposite end was provided with a gas feed tube. The element bundle at large was washed in a 20% by volume aqueous solution of hydrofluoric acid and then in distilled water, while applying ultrasonic waves; and then, the element bundle was dried. The element bundle was then inserted into a silica glass reactor tube of 30 mm. in inner diameter so as to be located at the center of the reactor tube, and the reactor tube was placed in an electric furnace maintained at 1,000° C. The two stage or three stage treatment under the condition shown in Table 1 was carried out on the element bundle (in case of Example 9, one stage treatment was carried out). The thus treated element bundle was taken out from the reactor tube, and drawn at 2,000° C. to produce a multiple fiber including 169 optical fibers and having an outer diameter of 1.6 mm.

By employing 169 multiple fibers so obtained, the same procedure as above was repeated to produce a multiple fiber including 28,561 optical fibers and having an outer diameter of 1.4 mm.

In examination of the sections of the multiple fibers obtained in the respective Examples with an optical microscope of 50 magnifications, no occurrence of bubbles was observed.

Also, the image-resolving power was measured in a case where each multiple fiber obtained was employed as an image-transmitting means. The results are shown also in Table 1. The image-resolving power was measured as follows.

After coating the entire surface of a multiple fiber having a length of 50 cm. with a black paint in order to prevent the entrance of external light into the multiple fiber, both ends thereof were cut down by several millimeters and the surfaces of the both ends were optically polished. As an object lens, a converging type rod image forming lens of 2 mm. in outer diameter and 35° in angle of visual field ("Selfoc Lens" made by Nippon Sheet Glass Company, Limited; SLS 2.0 mm.; pitch 0.25) was brought into close contact with one polished end of the multiple fiber. The image of an external visual field was formed on the face of this end of the multiple fiber, and was transmitted to the opposite end of the multiple fiber. The image was enlarged by a convex lens of 15 mm. in focal distance as an eye lens and was observed. On the other hand, a test chart A provided in EIAJ (Electronic Machine Industry Association of Japan) was prepared as a subject to be observed. The test chart A was placed at a distance of 100 mm. from the object lens, and was observed through the eye lens by the eye, to measure a limit that the individual black lines of the test chart in which white lines and black lines were arranged alternately could be discriminated from each other, namely, to measure the resolving power.

TABLE 1

| Ex. No. | First stage Composition of mixed gas (vol. ratio) | | First stage Total gas flow rate (ml./min.) | First stage Feeding time (min.) | Second stage Composition of mixed gas (vol. ratio) | | Second stage Total gas flow rate (ml./min.) | Second stage Feeding time (min.) | Third stage Composition of mixed gas (vol. ratio) | | Third stage Total gas flow rate (ml./min.) | Third stage Feeding time (min.) | Resolving power (lines/inch) |
|---|---|---|---|---|---|---|---|---|---|---|---|---|---|
| 9 | $BCl_3$ | 1 | 100 | 120 | — | | — | — | — | | — | — | 200 |
|   | $O_2$ | 10 | | | | | | | | | | | |
| 10 | $BCl_3$ | 1 | 100 | 15 | $BCl_3$ | 3 | 500 | 100 | $BCl_3$ | 1 | 100 | 15 | 400 |
|   | $O_2$ | 10 | | | $SiCl_4$ | 1 | | | $O_2$ | 10 | | | |
|   | | | | | $O_2$ | 1 | | | | | | | |
| 11 | $BCl_3$ | 1 | 100 | 15 | $BCl_3$ | 2 | 500 | 100 | — | — | — | 300 | |
|   | $O_2$ | 10 | | | $SiCl_4$ | 1 | | | | | | | |
|   | | | | | $O_2$ | 10 | | | | | | | |
| 12 | $BCl_3$ | 1 | 100 | 15 | $TiCl_4$ | 2 | 500 | 100 | $TiCl_4$ | 1 | 100 | 15 | 400 |
|   | $O_2$ | 10 | | | $SiCl_4$ | 1 | | | $O_2$ | 2 | | | |
|   | | | | | $O_2$ | 10 | | | | | | | |
| 13 | $BCl_3$ | 1 | 100 | 15 | $PCl_3$ | 4 | 500 | 100 | $PCl_3$ | 1 | 100 | 15 | 400 |
|   | $O_2$ | 10 | | | $SiCl_4$ | 1 | | | $O_2$ | 3 | | | |
|   | | | | | $O_2$ | 10 | | | | | | | |
| 14 | $BCl_3$ | 1 | 100 | 15 | $PCl_3$ | 4 | 500 | 100 | — | | — | — | 300 |
|   | $O_2$ | 10 | | | $SiCl_4$ | 1 | | | | | | | |
|   | | | | | $O_2$ | 10 | | | | | | | |
| 15 | $BCl_3$ | 1 | 100 | 15 | $GeCl_4$ | 5 | 500 | 100 | — | | — | — | 300 |
|   | $O_2$ | 10 | | | $SiCl_4$ | 1 | | | | | | | |
|   | | | | | $O_2$ | 10 | | | | | | | |
| 16 | $BCl_3$ | 1 | 100 | 15 | $BCl_3$ | 2 | 500 | 100 | $BCl_3$ | 1 | 100 | 15 | 450 |
|   | $O_2$ | 10 | | | $TiCl_4$ | 1 | | | $O_2$ | 10 | | | |
|   | | | | | $SiCl_4$ | 1 | | | | | | | |
|   | | | | | $O_2$ | 10 | | | | | | | |
| 17 | $SbCl_3$ | 1 | 100 | 10 | $SbCl_3$ | 1 | 500 | 100 | $BCl_3$ | 1 | 100 | 15 | 300 |
|   | $O_2$ | 10 | | | $SiCl_4$ | 1 | | | $O_2$ | 10 | | | |
|   | | | | | $O_2$ | 10 | | | | | | | |
| 18 | $SbCl_3$ | 1 | 100 | 10 | $AlCl_3$ | 1 | 500 | 100 | $BCl_3$ | 1 | 100 | 15 | 300 |
|   | $O_2$ | 10 | | | $SiCl_4$ | 1 | | | $O_2$ | 10 | | | |
|   | | | | | $O_2$ | 10 | | | | | | | |
| 19 | $BiCl_3$ | 1 | 100 | 10 | $BiCl_3$ | 1 | 500 | 100 | $BCl_3$ | 1 | 100 | 15 | 400 |
|   | $O_2$ | 10 | | | $SiCl_4$ | 1 | | | $O_2$ | 10 | | | |
|   | | | | | $O_2$ | 10 | | | | | | | |
| 20 | $BiCl_3$ | 1 | 100 | 10 | $SnCl_2$ | 1 | 500 | 100 | $BCl_3$ | 1 | 100 | 15 | 300 |
|   | $O_2$ | 10 | | | $SiCl_4$ | 1 | | | $O_2$ | 10 | | | |
|   | | | | | $O_2$ | 10 | | | | | | | |

EXAMPLE 21

While applying ultrasonic waves, 8,000 light-conducting elements (each element consisting of single optical fiber consisting of a pure silica glass core of 300 μm. in outer diameter, a cladding layer with a thickness of 35 μm. formed on the core and made of silica glass doped with $B_2O_3$ and F, and a silica glass support layer with a thickness of 15 μm. formed on the cladding layer, and having an outer diameter of 400 μm. and a length of 40 cm.) were washed in a 20% by volume aqueous solution of hydrofluoric acid and then in distilled water; and therefor, the elements were bundled in distilled water. The element bundle was then placed in approximately the middle of a synthetic silica pipe of 48 mm. in inner diameter, 51 mm. in outer diameter and 80 cm. in length. One end of the pipe was sealed, and while evacuating the pipe from the opposite end, the elements which came into contact with the wall of the pipe among the elements of the element bundle were fused together with the pipe wall with at least its both ends. Then, the sealed end of the pipe was again opened. The thus obtained synthetic silica pipe containing the element bundle was placed in an electric furnace maintained at 1,000° C., and a mixed gas of a precursor gas and an oxygen gas was fed from one end of the pipe and passed through the interstices between the elements to carry out a treatment by which an intermediary material was applied onto the surfaces of the respective elements. This treatment was carried out by the three stage treatment procedure under the same condition as in Example 16. The element bundle was then drawn together with the synthetic silica pipe at 2,000° C. to produce a multiple fiber of which the number of the optical fibers was 8,000 and the outer diameter was 1.4 mm. The section of the multiple fiber was examined with an optical microscope of 50 magnifications, but there was observed no bubble between the optical fibers.

We claim:

1. A method for producing an optical multiple fiber which comprises bundling a multiplicity of silica glass light-conducting elements and drawing the bundle of the light-conducting elements in the state that an intermediary material exists in the molten state among the elements; said intermediary material comprising at least one member selected from the group consisting of glass forming oxides, glass modifying oxides and intermediate oxides, provided that the use of $SiO_2$ alone as the intermediary material is excluded; and said intermediary material being formed on the surfaces of the previously bundled light-conducting elements, before carrying out the drawing of the bundle, by passing a precursor gas of the intermediary material through the interstices between the elements of the bundle maintained at a high temperature.

2. The method of claim 1, wherein each of the light-conducting elements is a single optical fiber.

3. The method of claim 1, wherein each of the light-conducting elements is a multiple fiber.

4. The method of claim 1, wherein the intermediary material is at least one oxide of an element selected from the group consisting of elements of Groups II, III, IV and V of the Periodic Table.

5. The method of claim 4, wherein the intermediary material is at least one oxide of an element selected from the group consisting of B, P, Ge, Sb, Bi, Sn, Tl, Ti, Cd and Pb.

6. The method of claim 4, wherein the intermediary material is a mixture of $SiO_2$ and at least one oxide of an element selected from the group consisting of B, P, Ge, Sb, Bi, Sn, Tl, Ti, Cd, Pb, Al and Ba.

7. The method of any one of claims 4, 5 or 6, wherein the intermediary material has a viscosity of $10^{-2}$ to $10^3$ poises at the drawing temperature.

8. The method of any one of claims 1, 4, 5 or 6, wherein the intermediary material contains a light-absorbing material.

9. The method of claim 1, wherein the precursor gas is passed together with a carrier gas.

10. The method of claim 9, wherein the precursor gas is a gas of a halide of an element which constitutes the intermediary material to be produced, and the carrier gas is oxygen gas.

11. The method of any one of claims 1, 2 or 3, wherein the intermediary material is formed on the surfaces of the light-conducting elements in layers which consist of an inner layer of an intermediary material having a low melt viscosity of not more than $10^2$ poises at a drawing temperature and a layer formed on the inner layer and made of a mixed intermediary material containing $SiO_2$.

12. The method of claim 9, wherein the precursor gas is passed together with the carrier gas through the interstices between the light-conducting elements of the bundle maintained at a temperature of 500° to 1,500° C.

13. The method of claim 1, wherein the precursor gas is passed through the interstices between the light-conducting elements of the bundle maintained at a temperature of 500° to 1,500° C.

14. The method of claim 1, wherein the precursor gas is a halide of boron.

15. A method for producing an optical multiple fiber which comprises:
bundling a multiplicity of fibers of silica glass light-conducting elements,
forming an intermediary material on the surfaces of the light-conducting elements of the resulting bundle, by passing a precursor gas of the intermediary material through the interstices between the elements of the bundle while maintaining the bundle at a high temperature; said intermediary material comprising at least one of glass forming oxide, glass modifying oxide and intermediate oxides, but not including $SiO_2$ alone, and
drawing the bundle of the elements while maintaining the intermediary material in a molten state among the elements.

16. The method of claim 15, wherein the precursor gas alone is passed through the interstices between the elements of the bundle.

17. The method of claim 1 or 15 wherein the precursor is a fluoride of boron.

* * * * *